US012620897B2

(12) United States Patent
Zhang

(10) Patent No.: US 12,620,897 B2
(45) Date of Patent: May 5, 2026

(54) TWO-PHASE PARALLELED SWITCHING CONVERTER, AND SWITCHING CIRCUIT AND CONTROL METHOD THEREOF

(71) Applicant: Chengdu Monolithic Power Systems Co., Ltd., Chengdu (CN)

(72) Inventor: Yuxin Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 274 days.

(21) Appl. No.: 18/450,772

(22) Filed: Aug. 16, 2023

(65) Prior Publication Data

US 2023/0402923 A1    Dec. 14, 2023

(30) Foreign Application Priority Data

Aug. 25, 2022    (CN) .......................... 202211026262.6

(51) Int. Cl.
H02M 3/158        (2006.01)
H02M 1/00        (2006.01)

(52) U.S. Cl.
CPC ......... H02M 3/158 (2013.01); H02M 1/0003 (2021.05)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS

| | | | |
|---|---|---|---|
| 9,106,131 B2 | 8/2015 | Li et al. | |
| 10,164,514 B2 | 12/2018 | Li | |
| 11,088,611 B2 | 8/2021 | Jin et al. | |
| 2020/0251979 A1* | 8/2020 | Jin ........................ | H02M 3/158 |

OTHER PUBLICATIONS

U.S. Appl. No. 17/330,584, filed Dec. 8, 2022, Monolithic Power Systems, Inc.

* cited by examiner

*Primary Examiner* — Bryan R Perez
(74) *Attorney, Agent, or Firm* — Perkins Coie LLP

(57)        ABSTRACT

A switching converter has an input terminal and an output terminal. A first terminal of a first switch is coupled to the input terminal. A first terminal of a second switch is coupled to a second terminal of the first switch through a first energy storage device. A first terminal of a third switch is coupled to the second terminal of the first switch. A first terminal of a fourth switch is coupled to a second terminal of the third switch. A second terminal of the fourth switch is coupled to a second terminal of the second switch. A first terminal of a fifth switch is coupled to the second terminal of the third switch. A second terminal of the fifth switch is coupled to the second terminal of the second switch through a second energy storage device.

19 Claims, 6 Drawing Sheets

1100

St1 — coupling a first terminal of a first switch to the input terminal of the switching converter; coupling a first terminal of a second switch to a second terminal of the first switch; coupling a first terminal of a third switch to the second terminal of the first switch and the first terminal of the second switch; coupling a first terminal of a fourth switch to a second terminal of the third switch; coupling a second terminal of the fourth switch to a second terminal of the second switch; coupling a first terminal of a fifth switch to the second terminal of the third switch and the first terminal of the fourth switch; and coupling a second terminal of the fifth switch to the second terminal of the second switch and the second terminal of the fourth switch. The first terminal of the second switch, the second terminal of the third switch, and the first terminal of the fourth switch are coupled to the output terminal through an energy storage circuit.

St2 — when the output voltage is lower than half of the input voltage, the switching converter repeatedly operates in states S1, S4, S3, and S4 in sequence. In the state S1: maintaining the first switch and the fourth switch on, and maintaining the second switch, the third switch, and the fifth switch off. In the state S3: maintaining the second switch and the third switch on, and maintaining the first switch, the fourth switch, and the fifth switch off. In the state S4: maintaining the second switch and the fourth switch on, and maintaining the first switch, the third switch, and the fifth switch off

St3 — when the output voltage is higher than half of the input voltage, the switching converter repeatedly operates in states S1, S5, S3, S2, and S5 in sequence or repeatedly operates in states S1, S5, S2, and S5 in sequence. In the state S2: maintaining the second switch, the third switch, and the fifth switch on, and maintaining the first switch and the fourth switch off. In the state S5: maintaining the first switch and the fifth switch on, and maintaining the second switch, the third switch, and the fourth switch off.

St4 — when in the DCM, the switching converter repeatedly operates in states S6, S8, S3, S4, and S7 in sequence. In the state S6: maintaining the first switch on, and maintaining the second switch, the third switch, the fourth switch, and the fifth switch off. In the state S7: maintaining the third switch on, and maintaining the first switch, the second switch, the fourth switch, and the fifth switch off. In the state S8: maintaining the second switch on, and maintaining the first switch, the third switch, the fourth switch, and the fifth switch off.

FIG. 11

TWO-PHASE PARALLELED SWITCHING CONVERTER, AND SWITCHING CIRCUIT AND CONTROL METHOD THEREOF

CROSS-REFERENCE TO RELATED APPLICATIONS

This application claims priority to and the benefit of Chinese Patent Application No. 202211026262.6, filed on Aug. 25, 2022, which is incorporated herein by reference in its entirety.

TECHNICAL FIELD

The present invention relates generally to electronic circuits, and more particularly but not exclusively to switching converters, and switching circuits and control method thereof.

BACKGROUND OF THE INVENTION

With the development of the computer and electronic industry, high efficiency, low output ripple and high load dynamic performance are required in switching converters. Therefore, it is necessary to design a switching converter with a new topology instead of conventional single-phase switching converters to meet the above requirements.

SUMMARY OF THE INVENTION

According to an embodiment of the present invention, a switching circuit for a switching converter is provided. The switching converter has an input terminal configured to receive an input voltage and an output terminal configured to provide an output voltage. The switching circuit comprises: a first switch, a second switch, a third switch a fourth switch and a fifth switch. The first switch has a first terminal and a second terminal, wherein the first terminal of the first switch is coupled to the input terminal. The second switch has a first terminal and a second terminal, wherein the first terminal of the second switch is coupled to the second terminal of the first switch through a first energy storage device. The third switch has a first terminal and a second terminal, wherein the first terminal of the third switch is coupled to the second terminal of the first switch and is coupled to the first terminal of the second switch through the first energy storage device. The fourth switch has a first terminal and a second terminal, wherein the first terminal of the fourth switch is coupled to the second terminal of the third switch, and the second terminal of the fourth switch is coupled to the second terminal of the second switch. The fifth switch has a first terminal and a second terminal, wherein the first terminal of the fifth switch is coupled to the second terminal of the third switch and the first terminal of the fourth switch, the second terminal of the fifth switch is coupled to the second terminal of the second switch and the second terminal of the fourth switch through a second energy storage device. The first terminal of the second switch, the second terminal of the third switch, the first terminal of the fourth switch, and the first terminal of the fifth switch are coupled to the output terminal through an energy storage circuit.

According to another embodiment of the present invention, a switching converter having an input terminal configured to receive an input voltage and an output terminal configured to provide an output voltage is provided. The switching converter comprises an energy storage circuit and a switching circuit. The switching circuit comprises: a first switch, a second switch, a third switch a fourth switch and a fifth switch. The first switch has a first terminal and a second terminal, wherein the first terminal of the first switch is coupled to the input terminal. The second switch has a first terminal and a second terminal, wherein the first terminal of the second switch is coupled to the second terminal of the first switch through a first energy storage device. The third switch has a first terminal and a second terminal, wherein the first terminal of the third switch is coupled to the second terminal of the first switch and is coupled to the first terminal of the second switch through the first energy storage device. The fourth switch has a first terminal and a second terminal, wherein the first terminal of the fourth switch is coupled to the second terminal of the third switch, and the second terminal of the fourth switch is coupled to the second terminal of the second switch. The fifth switch has a first terminal and a second terminal, wherein the first terminal of the fifth switch is coupled to the second terminal of the third switch and the first terminal of the fourth switch, the second terminal of the fifth switch is coupled to the second terminal of the second switch and the second terminal of the fourth switch through a second energy storage device. The first terminal of the second switch, the second terminal of the third switch, the first terminal of the fourth switch, and the first terminal of the fifth switch are coupled to the output terminal through the energy storage circuit.

According to yet another embodiment of the present invention, a control method for a switching converter is provided. The switching converter has a first switch, a second switch, a third switch, a fourth switch, a fifth switch, an input terminal configured to receive an input voltage, and an output terminal configured to provide an output voltage. The control method comprises several main steps. (I) Coupling a first terminal of the first switch to the input terminal of the switching converter. (II) Coupling a first terminal of the second switch to a second terminal of the first switch. (III) Coupling a first terminal of the third switch to the second terminal of the first switch and the first terminal of the second switch. (IV) Coupling a first terminal of the fourth switch to a second terminal of the third switch, and coupling a second terminal of the fourth switch to the second terminal of the second switch. (V) Coupling a first terminal of the fifth switch to the second terminal of the third switch and the first terminal of the fourth switch, and coupling a second terminal of the fifth switch to the second terminal of the second switch and the second terminal of the fourth switch. The first terminal of the second switch, the second terminal of the third switch, the first terminal of the fourth switch, and the first terminal of the fifth switch are coupled to the output terminal through an energy storage circuit.

BRIEF DESCRIPTION OF THE DRAWINGS

The present invention can be further understood with reference to the following detailed description and the appended drawings.

FIG. 11 shows a flowchart of a control method 1100 for a switching converter in accordance with an embodiment of the present invention.

Figure 1:
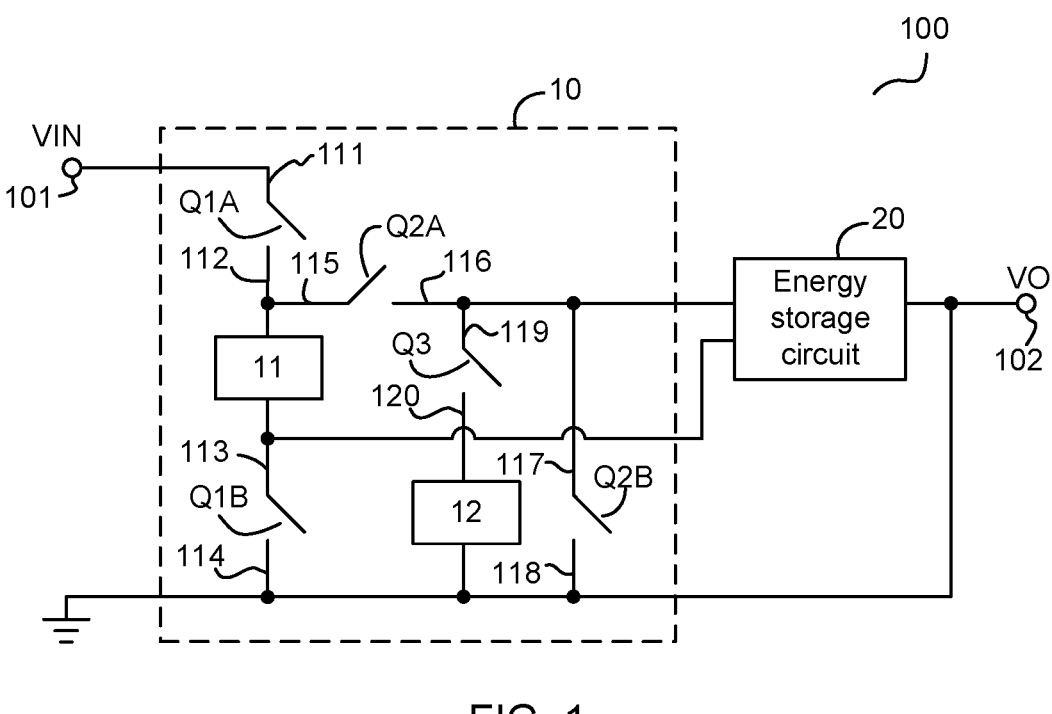
FIG. 1 shows a switching converter 100 in accordance with an embodiment of the present invention.

The use of the same reference label in different drawings indicates the same or like components.

DETAILED DESCRIPTION

Various embodiments of the present invention will be described in detail below, and it should be noted that the embodiments described here are only for illustration. However, the present invention is not limited thereto. In the following description, numerous specific details, such as example circuits and example values for these circuit components, and methods are illustrated in order to provide a thorough understanding of the present invention. It will be apparent for persons having ordinary skill in the art that the present invention can be practiced without one or more specific details, or with other methods, components, materials. In other instances, well-known circuits, materials or methods are not shown or described in detail in order to avoid obscuring the present invention.

Throughout this description, the phrases "in one embodiment", "in an embodiment", "in some embodiments", "in an example", "in some examples", "in one implementation", and "in some implementations" as used to include both combinations and sub-combinations of various features described herein as well as variations and modifications thereof. These phrases used herein does not necessarily refer to the same embodiment, although it may. Additionally, persons having ordinary skill in the art will understand that the drawings provided herein are for illustrative purposes and are not necessarily drawn to scale. The similar elements are provided with similar reference numerals. As used herein, the term "and/or" includes any combinations of one or more of the listed items.

FIG. 1 shows a switching converter 100 in accordance with an embodiment of the present invention. The switching converter 100 has an input terminal 101 configured to receive an input voltage VIN, an output terminal 102 configured to provide an output voltage VO, and a switching circuit 10. In the embodiment as shown in FIG. 1, the switching circuit 10 comprises switches Q1A, Q1B, Q2A, Q2B, and Q3. The switches Q1A, Q1B, Q2A, Q2B, and Q3 may be MOSFETs (Metal Oxide Semiconductor Field Effect Transistors), JFETs (Junction Field-effect Transistors), IGBTs (Insulated Gate Bipolar Transistors), and any other suitable power devices.

The switching converter 100 converts the input voltage VIN to the output voltage VO through turning on and off the switches Q1A, Q1B, Q2A, Q2B, and Q3 respectively. The switch Q1A has a first terminal 111 coupled to the input terminal 101 and a second terminal 112. The switch Q1B has a first terminal 113 and a second terminal 114. The first terminal 113 of the switch Q1B is coupled to the second terminal 112 of the switch Q1A through an energy storage device 11, and the second terminal 114 of the switch Q1B is coupled to a reference ground. In one embodiment, the energy storage device 11 is an inductor or a capacitor. The switch Q2A has a first terminal 115 and a second terminal 116. The first terminal 115 of the switch Q2A is coupled to the second terminal 112 of the switch Q1A. The switch Q2B has a first terminal 117 and a second terminal 118. The first terminal 117 of the switch Q2B is coupled to the second terminal 116 of the switch Q2A. The second terminal 118 of the switch Q2B is coupled to the second terminal 114 of the switch Q1B (i.e., reference ground). The switch Q3 has a first terminal 119 and a second terminal 120. The first terminal 119 of the switch Q3 is coupled to the second terminal 116 of the switch Q2A. The second terminal 120 of the switch Q3 is coupled to the second terminal 114 of the switch Q1B and the second terminal 118 of the switch Q2B (i.e., reference ground) through an energy storage device 12. In one embodiment, the energy storage device 12 may be an inductor or a capacitor. In the embodiment as shown in FIG. 1, the switching converter 100 further comprises an energy storage circuit 20. In one embodiment, the first terminal 113 of the switch Q1B is coupled to the output terminal 102 through the energy storage circuit 20, the second terminal 116 of the switch Q2A and the first terminal 117 of the switch Q2B are coupled to the output terminal 102 through the energy storage circuit 20. In one embodiment, the energy storage circuit may be an inductor or a capacitor.

Figure 2:
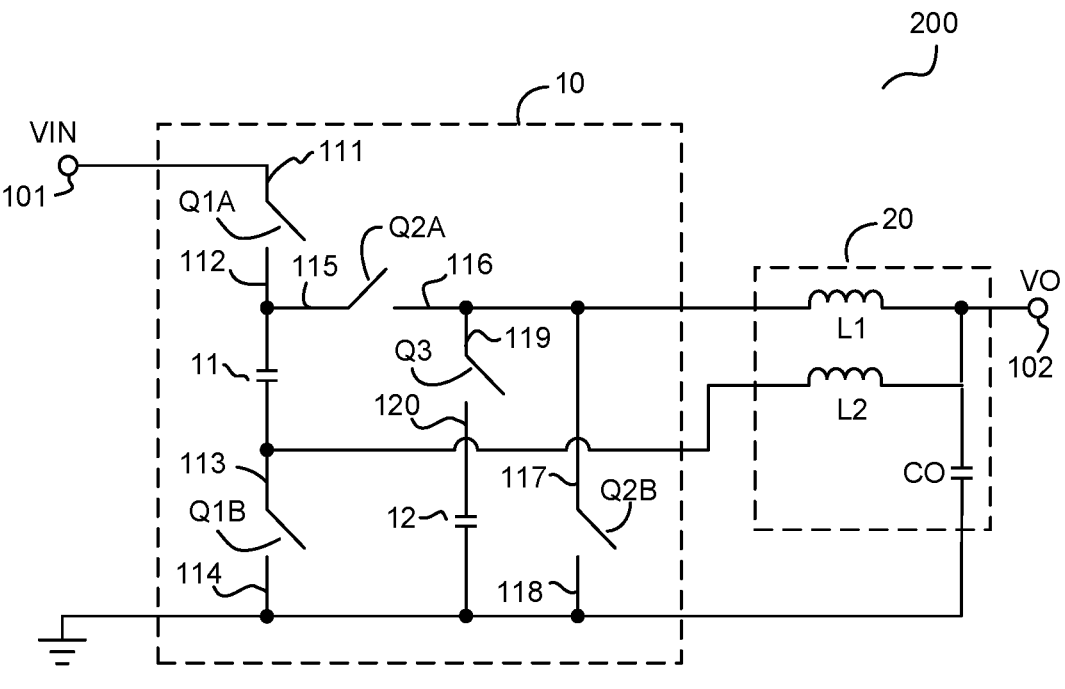
FIG. 2 shows a switching converter 200 in accordance with an embodiment of the present invention.

FIG. 2 schematically shows a switching converter 200 in accordance with an embodiment of the present invention. In the embodiment as shown in FIG. 2, the energy storage devices 11 and 12 are capacitors. Persons having ordinary skill in the art should understand that the energy storage devices 11 and 12 could be inductors or other suitable energy storage devices. In the embodiment as shown in FIG. 2, the energy storage circuit 20 comprises an inductor L1 and an inductor L2. The second terminal 116 of the switch Q2A, the first terminal 117 of the switch Q2B, and the first terminal 119 of the switch Q3 are coupled to the output terminal 102 through the inductor L1. The first terminal 113 of the switch Q1B is coupled to the output terminal 102 through the inductor L2. In one embodiment, the energy storage circuit 20 further comprises an output capacitor CO coupled between the input terminal 102 and the reference ground.

When the switching converter 200 operates normally, both of the voltage across the capacitors 11 and 12 are half of the input voltage VIN (i.e., 0.5VIN). The voltage stress across the switches Q1A, Q1B, Q2A, Q2B, and Q3 during turning on and off are all half of the input voltage VIN (i.e., 0.5VIN). Thus, the switching loss of the switching converter 200 decreases. Besides, the decreasing of the voltage stress reduces the cost of the switches, thereby reducing the cost of the switching converter 200.

The switching circuit 10 for example, may comprise but not limited to 5 different states S1-S5 as shown in FIGS. 3-7 to transmit power.

Figure 3:
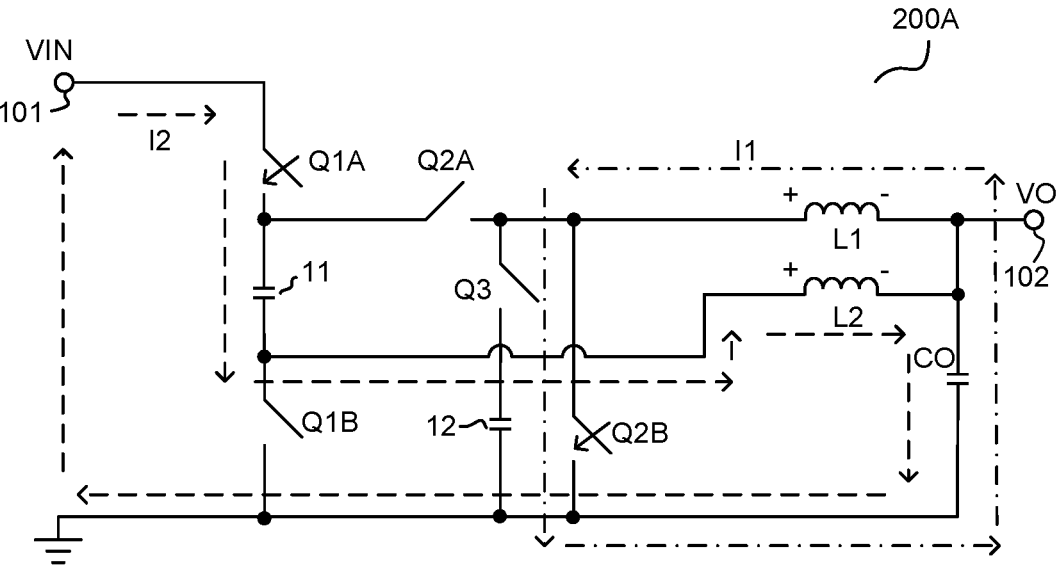
FIG. 3 shows a schematic diagram 200A when a switching circuit 10 operates in a state S1 in accordance with an embodiment of the present invention.

FIG. 3 shows a schematic diagram 200A when the switching circuit 10 operates in the state S1 in accordance with an embodiment of the present invention. When the switching circuit 10 operates in the state S1, the switches Q1A and Q2B are maintained on, while the switches Q1B, Q2A, and Q3 are maintained off. The voltage across the inductor L1 is –VO, the slope of the current I1 flowing through the inductor L1 is –VO/L1. The current I2 flows from the input terminal 101 through the switch Q1A, the inductor L2, and the reference ground, and flows back to the input terminal 101, to supply power to the capacitor CO and a load (not shown). The voltage across the inductor L2 is 0.5VIN–VO, the slope of the current I2 flowing through the inductor L2 is (0.5VIN–VO)/L2.

Figure 4:
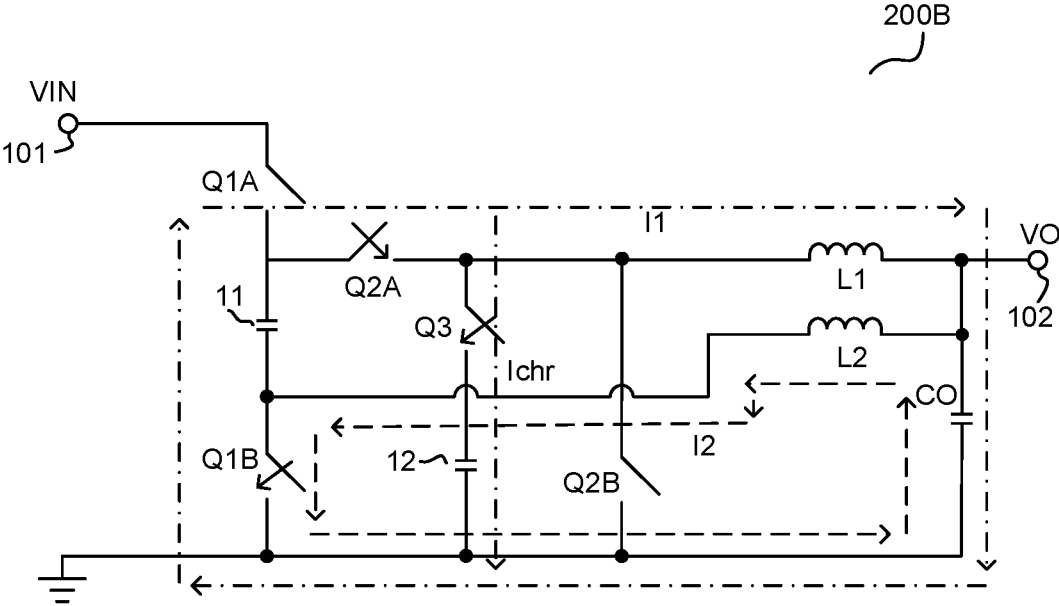
FIG. 4 shows a schematic diagram 200B when the switching circuit 10 operates in a state S2 in accordance with an embodiment of the present invention.

FIG. 4 shows a schematic diagram 200B when the switching circuit 10 operates in the state S2 in accordance with an embodiment of the present invention. When the switching circuit 10 operates in the state S2, the switches Q1B, Q2A, and Q3 are maintained on, while the switches Q1A and Q2B are maintained off. The voltage across the inductor L1 is 0.5VIN–VO, the slope of the current I1 flowing through the inductor L1 is (0.5VIN–VO)/L1. The voltage across the inductor L2 is –VO, the slope of the current I2 flowing through the inductor L2 is –VO/L2. The capacitor 11 charges the capacitor 12 by a charge current Ichr. In one embodiment, a per-charge circuit may be used to decrease the charge current Ichr. In another embodiment, the charge current Ichr is decreased by turning on the switch Q3 after a delay. Ideally, the voltage across the capacitor 12 is eventually equal to the voltage across the capacitor 11.

Figure 5:
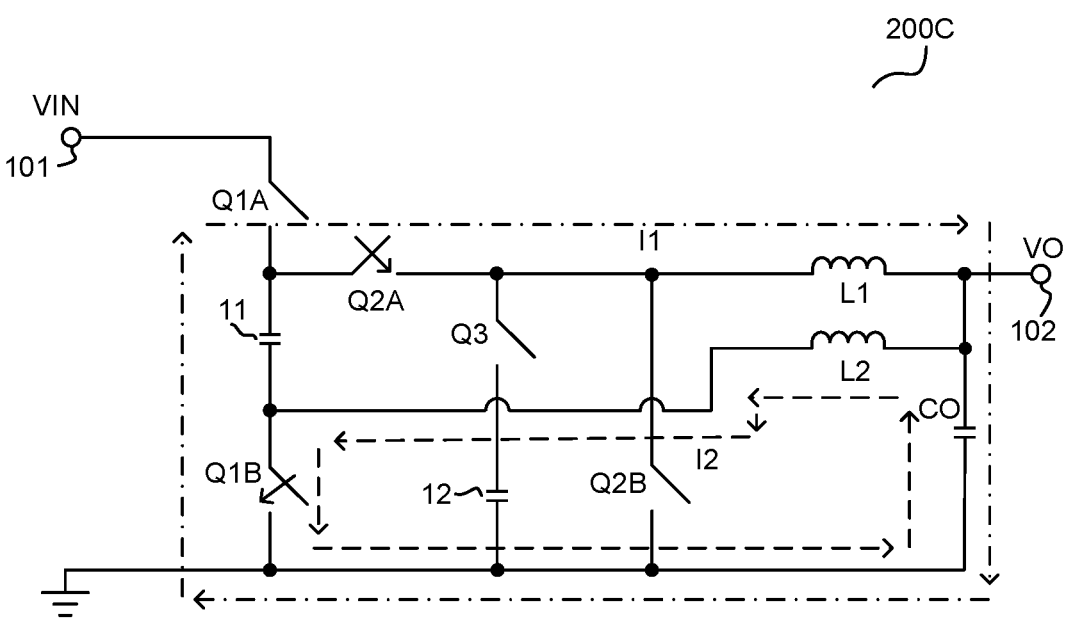
FIG. 5 shows a schematic diagram 200C when the switching circuit 10 operates in a state S3 in accordance with an embodiment of the present invention.

FIG. 5 shows a schematic diagram 200C when the switching circuit 10 operates in the state S3 in accordance with an embodiment of the present invention. When the switching circuit 10 operates in the state S3, the switches Q1B and Q2A are maintained on, while the switches Q1A, Q2B, and Q3 are maintained off. The voltage across the inductor L1 is 0.5VIN–VO, the slope of the current I1 flowing through the inductor L1 is (0.5VIN–VO)/L1. The voltage across the inductor L2 is –VO, the slope of the current I2 flowing through the inductor L2 is –VO/L2.

Figure 6:
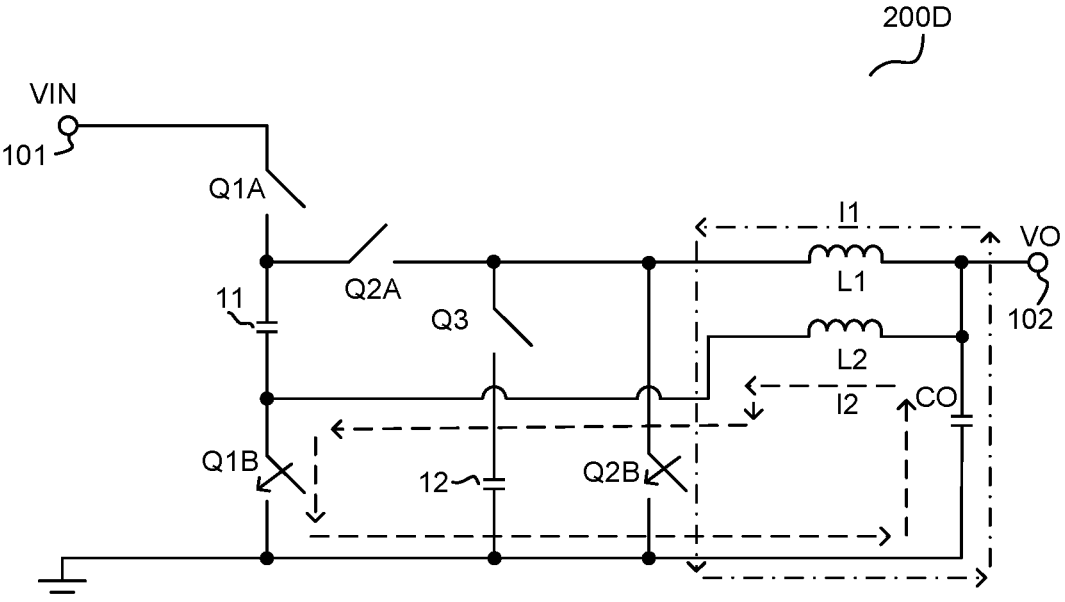
FIG. 6 shows a schematic diagram 200D when the switching circuit 10 operates in a state S4 in accordance with an embodiment of the present invention.

FIG. 6 shows a schematic diagram 200D when the switching circuit 10 operates in the state S4 in accordance with an embodiment of the present invention. When the switching circuit 10 operates in the state S4, the switches Q1B and Q2B are maintained on, while the switches Q1A, Q2A, and Q3 are maintained off. The voltage across the inductor L1 is –VO, the slope of the current I1 flowing through the inductor L1 is –VO/L1. The voltage across the inductor L2 is –VO, the slope of the current I2 flowing through the inductor L2 is –VO/L2.

Figure 7:
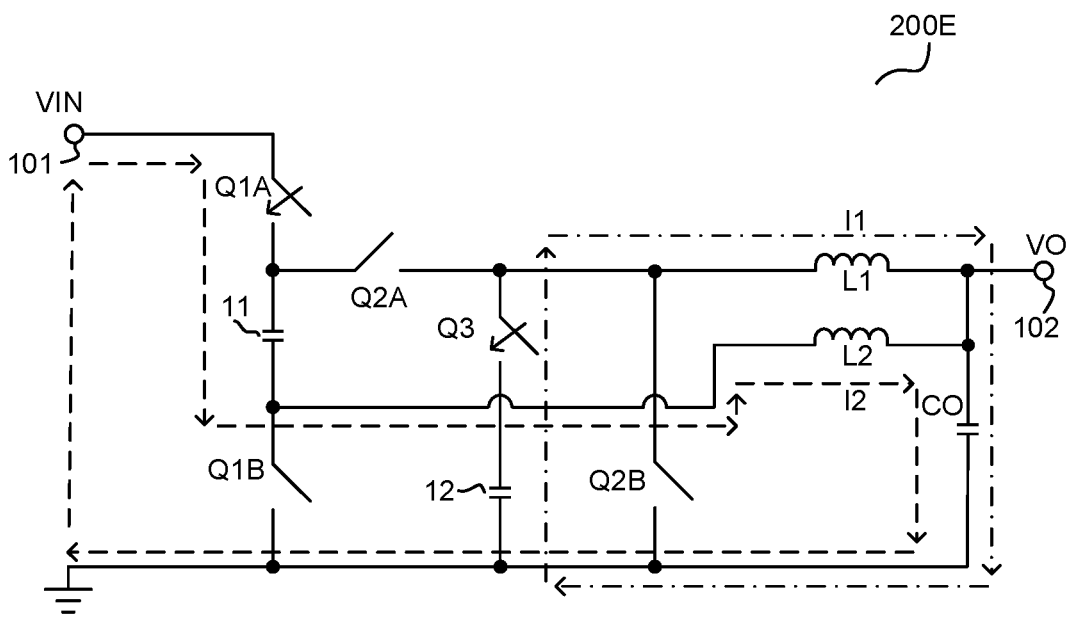
FIG. 7 shows a schematic diagram 200E when the switching circuit 10 operates in a state S5 in accordance with an embodiment of the present invention.

FIG. 7 shows a schematic diagram 200E when a switching circuit 10 operates in the state S5 in accordance with an embodiment of the present invention. When the switching circuit 10 operates in the state S5, the switches Q1A and Q3 are maintained on, while the switches Q1B, Q2A, and Q2B are maintained off. The voltage across the capacitor 12 is 0.5 VIN. The voltage across the inductor L1 is 0.5 VIN–VO. The slope of the current I1 flowing through the inductor L1 is (0.5VIN–VO)/L1. The voltage across the inductor L2 is 0.5VIN–VO. The slope of the current I2 flowing through the inductor L2 is (0.5VIN–VO)/L2.

In the embodiments of the present invention, the maximum output voltage VO is up to 0.5VIN. Response to different ranges of the output voltage VO, the switching circuit 10 operates in different states sequentially. In one embodiment, when the output voltage VO is in a range of 0V-0.25VIN, the switching circuit 10 repeatedly operates in states S1, S4, S3, and S4 in sequence. In one embodiment, when the output voltage VO is in a range of 0.25VIN-0.5VIN, the switching circuit 10 repeatedly operates in states S1, S5, S2, and S5 in sequence. However, the charge current between the capacitor 11 and the capacitor 12 is large when the operating state of the switching circuit 10 changes from the state S5 to the state S2. Thus, in another embodiment, when the output voltage VO is in a range of 0.25VIN-0.5VIN, the switching circuit 10 repeatedly operates in states S1, S5, S3, S2, and S5 in sequence to reduce the charge current between the capacitors 11 and 12. In the state S3, the pre-charge circuit may be used to balance the voltage between the capacitor 11 and the capacitor 12.

According to the switching converter of the embodiments of the present invention, the capacitors 11 and 12 are buffer capacitors used to decrease the input voltage VIN to 0.5VIN. The switching converter of the embodiments of the present invention could be considered as a two-phase paralleled switching converter with the input voltage of 0.5VIN. Whether the range of the output voltage VO is 0V-0.25VIN or the relationship between the input voltage VIN and the output voltage VO is D=2VO/VIN, where the duty cycle D may represent the ratio of the on-time period of a switch (e.g., Q1A or Q2A) to a switching period in one switching period. The duty cycle of a conventional buck converter is VO/VIN, where the duty cycle may represent the ratio of the on-time period of a high side switch to a switching period in one switching period. Thus, the duty cycle of the switching converter of the embodiments of the present invention is double to the duty cycle of the conventional switching converter. A larger duty cycle D of the present invention facilitates the design of a high switching frequency control system.

Figure 8:
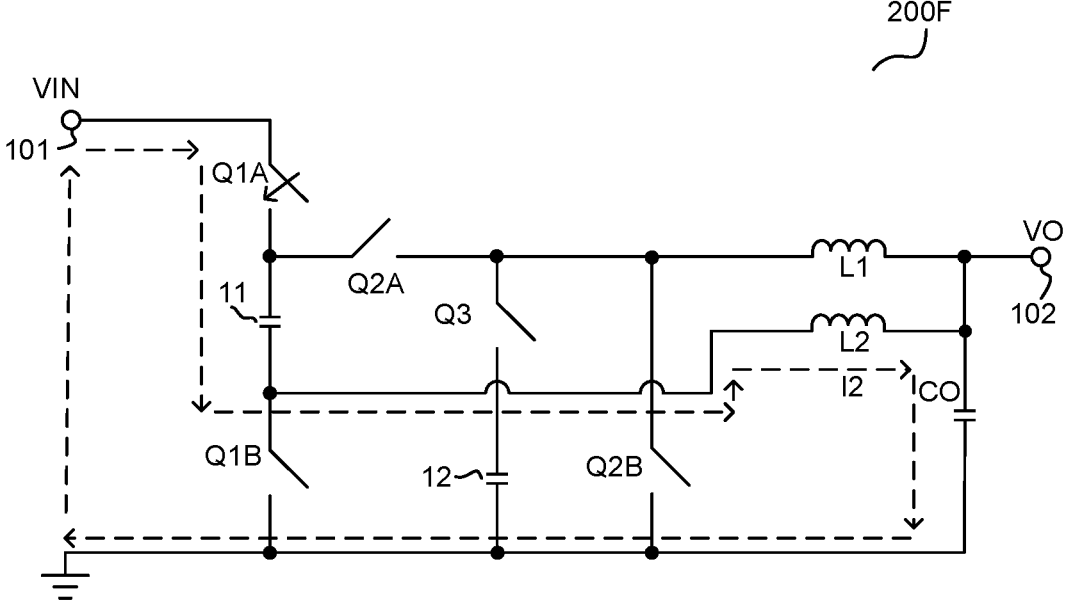
FIG. 8 shows a schematic diagram 200F when the switching circuit 10 operates in a state S6 in accordance with an embodiment of the present invention.
Figure 9:
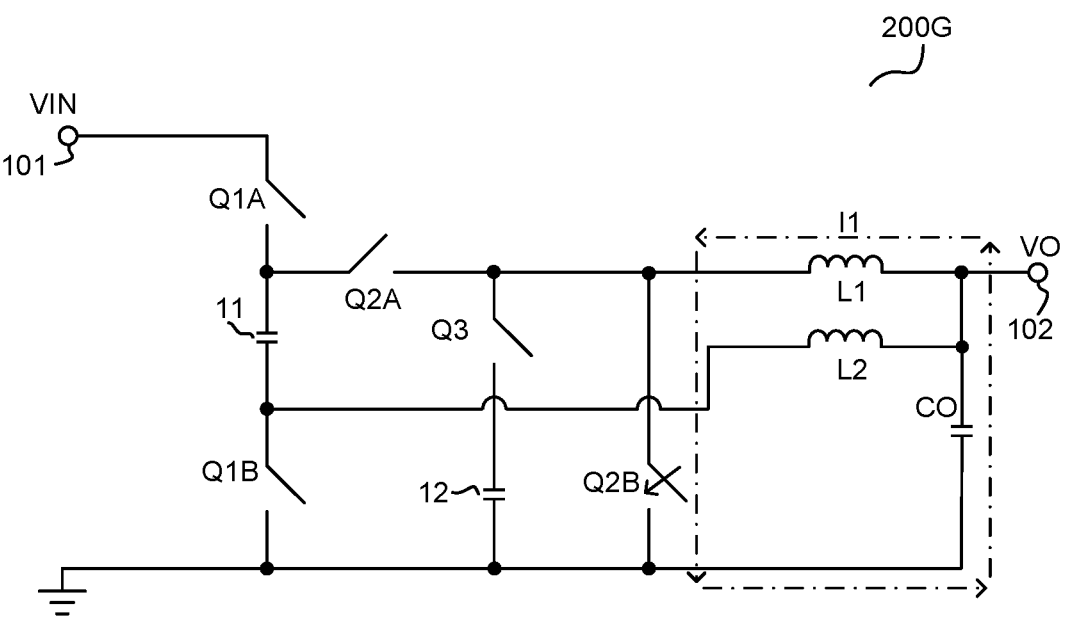
FIG. 9 shows a schematic diagram 200G when the switching circuit 10 operates in a state S7 in accordance with an embodiment of the present invention.

When in DCM (Discontinuous Conduction Mode), the switching circuit 10 may comprise but not limited to another three different states S6-S8, as shown in FIGS. 8-9.

FIG. 8 shows a schematic diagram 200F when the switching circuit 10 operates in the state S6 in accordance with an embodiment of the present invention. When the switching circuit 10 operates in the state S6, the switch Q1A is maintained on, while the switches Q1B, Q2A, Q2B, and Q3 are maintained off. The power is transmitted to the output terminal 102 through the inductor L2. The current I1 flowing through the inductor L1 is 0A.

FIG. 9 shows a schematic diagram 200G when the switching circuit 10 operates in the state S7 in accordance with an embodiment of the present invention. When the switching circuit 10 operates in the state S7, the switch Q2B is maintained on, while the switches Q1A, Q1B, Q2A, and Q3 are maintained off. The current I1 flowing through the inductor L1 decreases gradually but still greater than 0A. The current I2 flowing through the inductor L2 is 0A.

Figure 10:
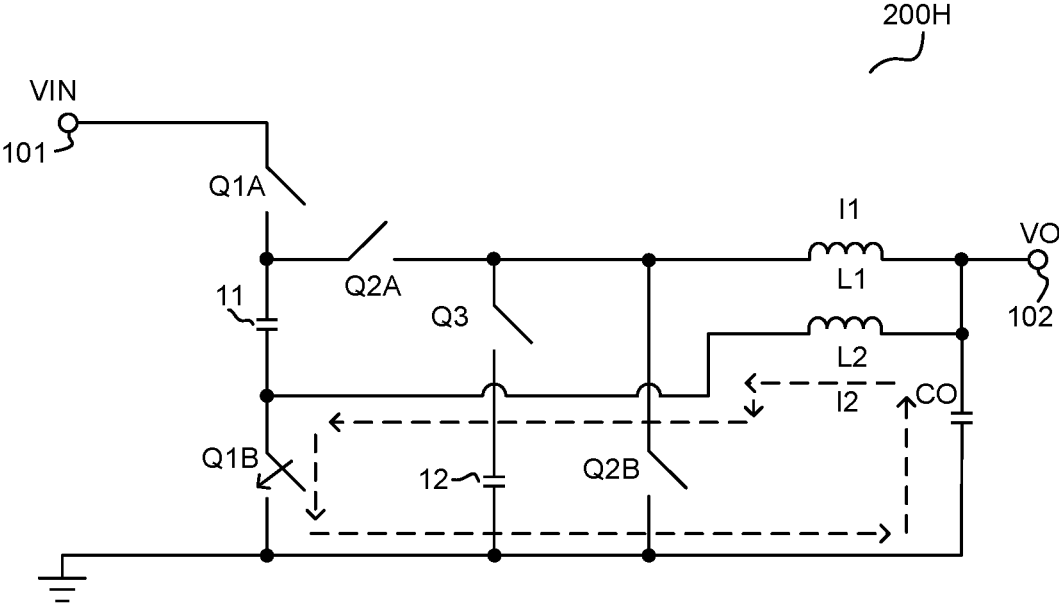
FIG. 10 shows a schematic diagram 200H when the switching circuit 10 operates in a state S8 in accordance with an embodiment of the present invention.

FIG. 10 shows a schematic diagram 200H when the switching circuit 10 operates in the state S8 in accordance with an embodiment of the present invention. When the switching circuit 10 operates in the state S8, the switch Q1B is maintained on, while the switches Q1A, Q2A, Q2B, and Q3 are maintained off. The current I2 flowing through the inductor L2 decreases gradually but still greater than 0A. The current I1 flowing through the inductor L1 is 0A.

In one embodiment, when in DCM, the switching circuit 10 repeatedly operates in states S6, S8, S3, S4 and S7 in sequence, the output voltage VO is range from 0V-0.25VIN. Persons having ordinary skill in the art will understand that the switching circuit 10 may repeatedly operate in other suitable states in sequence.

Compared with the switching converter having the same input and output specifications, the switching converter of the embodiments of the present invention has higher efficiency, better load dynamic performance, lower output ripple, and larger duty cycle. Since the circuit topology reduces the switching stress to half of the input voltage VIN, thus the switching loss is reduced, and the efficiency of the switching converter of the embodiments of the present invention is improved. Besides, switches with a lower voltage rating could be used to reduce the cost of the switching converter. Since the circuit topology divides the switching converter into two out of phase parts with the same input and output specifications, thus the equivalent switching frequency is doubled, and the switching converter of the embodiments of the present invention has better load dynamic performance and lower output ripple. Compared with the conventional switching converter, the switching converter of the embodiments of the present invention has larger duty cycle, as a result, larger switching on-time period is presented. The larger duty cycle helps to reduce the design difficulty of the high switching frequency system with a peak current control.

FIG. 11 shows a flowchart of a control method 1100 for a switching converter in accordance with an embodiment of the present invention, including steps St1-St4. The switching converter has an input terminal for receiving an input voltage and an output terminal for providing an output voltage.

In the step St1, coupling a first terminal of a first switch to the input terminal of the switching converter; coupling a first terminal of a second switch to a second terminal of the first switch; coupling a first terminal of a third switch to the second terminal of the first switch and the first terminal of the second switch; coupling a first terminal of a fourth switch to a second terminal of the third switch; coupling a second terminal of the fourth switch to a second terminal of the second switch; coupling a first terminal of a fifth switch to the second terminal of the third switch and the first terminal of the fourth switch; and coupling a second terminal of the fifth switch to the second terminal of the second switch and the second terminal of the fourth switch. The first terminal of the second switch, the second terminal of the third switch, and the first terminal of the fourth switch are coupled to the output terminal through an energy storage circuit.

In the step St2, when the output voltage is lower than half of the input voltage, the switching converter repeatedly operates in states S1, S4, S3, and S4 in sequence. In the state S1: maintaining the first switch and the fourth switch on, and maintaining the second switch, the third switch, and the fifth switch off. In the state S3: maintaining the second switch and the third switch on, and maintaining the first switch, the fourth switch, and the fifth switch off. In the state S4: maintaining the second switch and the fourth switch on, and maintaining the first switch, the third switch, and the fifth switch off.

In the step St3, when the output voltage is higher than half of the input voltage, the switching converter repeatedly operates in states S1, S5, S3, S2, and S5 in sequence or repeatedly operates in states S1, S5, S2, and S5 in sequence. In the state S2: maintaining the second switch, the third switch, and the fifth switch on, and maintaining the first switch and the fourth switch off. In the state S5: maintaining the first switch and the fifth switch on, and maintaining the second switch, the third switch, and the fourth switch off.

In the step St4, when in the DCM, the switching converter repeatedly operates in states S6, S8, S3, S4, and S7 in sequence. In the state S6: maintaining the first switch on, and maintaining the second switch, the third switch, the fourth switch, and the fifth switch off. In the state S7: maintaining the third switch on, and maintaining the first switch, the second switch, the fourth switch, and the fifth switch off. In the state S8: maintaining the second switch on, and maintaining the first switch, the third switch, the fourth switch, and the fifth switch off.

It should be noted that the order of the steps in the above flowchart is not limited to that shown in FIG. 11, for example, two consecutive steps may be performed simultaneously or in reverse order.

Although the invention has been described with reference to several exemplary embodiments, it should be understood that by persons skilled in the art that the present disclosure is not limited to what has been particularly shown and described herein above. Rather the scope of the present disclosure is defined by the claims and includes both combinations and sub-combinations of the various features described hereinabove as well as variations and modifications thereof which would occur to persons skilled in the art upon reading the foregoing description and which are not in the prior art.

What is claimed is:

1. A switching circuit for a switching converter, the switching converter having an input terminal configured to receive an input voltage and an output terminal configured to provide an output voltage, the switching circuit comprising:

a first switch having a first terminal and a second terminal, wherein the first terminal of the first switch is coupled to the input terminal;

a second switch having a first terminal and a second terminal, wherein the first terminal of the second switch is coupled to the second terminal of the first switch through a first energy storage device;

a third switch having a first terminal and a second terminal, wherein the first terminal of the third switch is coupled to the second terminal of the first switch and is coupled to the first terminal of the second switch through the first energy storage device;

a fourth switch having a first terminal and a second terminal, wherein the first terminal of the fourth switch is coupled to the second terminal of the third switch, and the second terminal of the fourth switch is coupled to the second terminal of the second switch; and a fifth switch having a first terminal and a second terminal, wherein the first terminal of the fifth switch is coupled to the second terminal of the third switch and the first terminal of the fourth switch, the second terminal of the fifth switch is coupled to the second terminal of the second switch and the second terminal of the fourth switch through a second energy storage device; and wherein the first terminal of the second switch, the second terminal of the third switch, the first terminal of the fourth switch, and the first terminal of the fifth switch are coupled to the output terminal through an energy storage circuit; and wherein the switching circuit is capable of operating in a first state, a second state, a third state, and a fourth state, wherein:

in the first state, the first switch and the fourth switch are maintained on, while the second switch, the third switch, and the fifth switch are maintained off;

in the second state, the second switch, the third switch, and the fifth switch are maintained on, while the first switch and the fourth switch are maintained off;

in the third state, the second switch and the third switch are maintained on, while the first switch, the fourth switch, and the fifth switch are maintained off; and in the fourth state, the second switch and the fourth switch are maintained on, while the first switch, the third switch, and the fifth switch are maintained off.

2. The switching circuit of claim 1, wherein the first energy storage device comprises a first capacitor, and the second energy storage device comprises a second capacitor.

3. The switching circuit of claim 1, wherein when the output voltage is lower than half of the input voltage, the switching circuit repeatedly operates in the first state, the fourth state, the third state, and the fourth state in sequence.

4. The switching circuit of claim 1, wherein:

the switching circuit is further capable of operating in a fifth state, when the output voltage is higher than half of the input voltage, the switching circuit repeatedly operates in the first state, the fifth state, the third state, the second state, and the fifth state in sequence; and wherein in the fifth state, the first switch and the fifth switch are maintained on, while the second switch, the third switch, and the fourth switch are maintained off.

5. The switching circuit of claim 1, wherein:

the switching circuit is further capable of operating in a fifth state, when the output voltage is higher than half of the input voltage, the switching circuit repeatedly operates in the first state, the fifth state, the second state, and the fifth state in sequence; and wherein in the fifth state, the first switch and the fifth switch are maintained on, while the second switch, the third switch, and the fourth switch are maintained off.

6. The switching circuit of claim 1, wherein:

the switching circuit is further capable of operating in a sixth state, a seventh state, and an eighth state;

in the sixth state, the first switch is maintained on, while the second switch, the third switch, the fourth switch, and the fifth switch are maintained off;

in the seventh state, the third switch is maintained on, while the first switch, the second switch, the fourth switch, and the fifth switch are maintained off; and in the eighth state, the second switch is maintained on, while the first switch, the third switch, the fourth switch, and the fifth switch are maintained off.

7. The switching circuit of claim 5, in response to a discontinuous conduction mode, the switching circuit repeatedly operates in the sixth state, the eighth state, the third state, the fourth state, and the seventh state in sequence.

8. A switching converter having an input terminal configured to receive an input voltage and an output terminal configured to provide an output voltage, the switching converter comprising:

an energy storage circuit; and a switching circuit, comprising:

a first switch having a first terminal and a second terminal, wherein the first terminal of the first switch is coupled to the input terminal;

a second switch having a first terminal and a second terminal, wherein the first terminal of the second switch is coupled to the second terminal of the first switch through a first energy storage device;

a third switch having a first terminal and a second terminal, wherein the first terminal of the third switch is coupled to the second terminal of the first switch and is coupled to the first terminal of the second switch through the first energy storage device;

a fourth switch having a first terminal and a second terminal, wherein the first terminal of the fourth switch is coupled to the second terminal of the third switch, and the second terminal of the fourth switch is coupled to the second terminal of the second switch; and a fifth switch having a first terminal and a second terminal, wherein the first terminal of the fifth switch is coupled to the second terminal of the third switch and the first terminal of the fourth switch, the second terminal of the fifth switch is coupled to the second terminal of the second switch and the second terminal of the fourth switch through a second energy storage device; wherein the first terminal of the second switch, the second terminal of the third switch, the first terminal of the fourth switch, and the first terminal of the fifth switch are coupled to the output terminal through the energy storage circuit-; and wherein the switching circuit is capable of operating in a first state, a second state, a third state, and a fourth state, wherein:

in the first state, the first switch and the fourth switch are maintained on, while the second switch, the third switch, and the fifth switch are maintained off;

in the second state, the second switch, the third switch, and the fifth switch are maintained on, while the first switch and the fourth switch are maintained off;

in the third state, the second switch and the third switch are maintained on, while the first switch, the fourth switch, and the fifth switch are maintained off; and in the fourth state, the second switch and the fourth switch are maintained on, while the first switch, the third switch, and the fifth switch are maintained off.

9. The switching converter of claim 8, wherein the energy storage circuit comprises:

a first inductor having a first terminal and a second terminal, wherein the first terminal of the first inductor is coupled to the second terminal of the third switch, the first terminal of the fourth switch, and the first terminal of the fifth switch, and the second terminal of the first inductor is coupled to the output terminal; and a second inductor having a first terminal and a second terminal, wherein the first terminal of the second inductor is coupled to the first terminal of the second switch, and the second terminal of the second inductor is coupled to the output terminal.

10. The switching circuit of claim 8, wherein the switching circuit is capable of operating in fifth state.

11. The switching circuit of claim 10, wherein:

when the output voltage is higher than half of the input voltage, the switching circuit repeatedly operates in the first state, the fifth state, the third state, the second state, and the fifth state in sequence; wherein in the fifth state, the first switch and the fifth switch are maintained on, while the second switch, the third switch, and the fourth switch are maintained off.

12. The switching circuit of claim 10, wherein when the output voltage is higher than half of the input voltage, the switching circuit repeatedly operates in the first state, the fifth state, the second state, and the fifth state in sequence; wherein:

in the fifth state, the first switch and the fifth switch are maintained on, while the second switch, the third switch, and the fourth switch are maintained off.

13. The switching circuit of claim 8, wherein:

when the output voltage is lower than half of the input voltage, the switching circuit repeatedly operates in the first state, the fourth state, the third state, and the fourth state in sequence.

14. The switching circuit of claim 8, wherein:

in response to a discontinuous conduction mode, the switching circuit repeatedly operates in a sixth state, an eighth state, the third state, the fourth state, and a seventh state in sequence;

in the sixth state, the first switch is maintained on, while the second switch, the third switch, the fourth switch, and the fifth switch are maintained off;

in the seventh state, the third switch is maintained on, while the first switch, the second switch, the fourth switch, and the fifth switch are maintained off; and in the eighth state, the second switch is maintained on, while the first switch, the third switch, the fourth switch, and the fifth switch are maintained off.

15. A control method for a switching converter, the switching converter having a first switch, a second switch, a third switch, a fourth switch, and a fifth switch, an input terminal configured to receive an input voltage, and an output terminal configured to provide an output voltage, the control method comprising:

coupling a first terminal of the first switch to the input terminal of the switching converter;

coupling a first terminal of the second switch to a second terminal of the first switch;

coupling a first terminal of the third switch to the second terminal of the first switch and the first terminal of the second switch;

coupling a first terminal of the fourth switch to a second terminal of the third switch, and coupling a second terminal of the fourth switch to the second terminal of the second switch; and coupling a first terminal of the fifth switch to the second terminal of the third switch and the first terminal of the fourth switch, and coupling a second terminal of the fifth switch to the second terminal of the second switch and the second terminal of the fourth switch; wherein the first terminal of the second switch, the second terminal of the third switch, the first terminal of the fourth switch, and the first terminal of the fifth switch are coupled to the output terminal through an energy storage circuit-; and wherein the switching circuit is capable of operating in a first state, a second state, a third state, and a fourth state, wherein:

in the first state, the first switch and the fourth switch are maintained on, while the second switch, the third switch, and the fifth switch are maintained off;

in the second state, the second switch, the third switch, and the fifth switch are maintained on, while the first switch and the fourth switch are maintained off;

in the third state, the second switch and the third switch are maintained on, while the first switch, the fourth switch, and the fifth switch are maintained off; and in the fourth state, the second switch and the fourth switch are maintained on, while the first switch, the third switch, and the fifth switch are maintained off.

16. The control method of claim 15, further comprising:

when the output voltage is lower than half of the input voltage, the switching circuit repeatedly operates in a first state, a second state, a third state, and the second state in sequence.

17. The control method of claim 15, further comprising:

when the output voltage is higher than half of the input voltage, the switching circuit repeatedly operates in a first state, a fourth state, a third state, a fifth state, and a fifth state in sequence; wherein in the fifth state, the second switch, the third switch, and the fifth switch are maintained on, while the first switch and the fourth switch are maintained off.

18. The control method of claim 15, further comprising:

when the output voltage is higher than half of the input voltage, the switching circuit repeatedly operates in a first state, a fourth state, a fifth state, and the fourth state in sequence; wherein in the fifth state, the second switch, the third switch, and the fifth switch are maintained on, while the first switch and the fourth switch are maintained off.

19. The control method of claim 15, further comprising:

when the switching circuit operates in discontinuous conduction mode, the switching circuit repeatedly operates in a sixth state, a seventh state, a third state, a second state, and an eighth state in sequence, wherein in the sixth state, the first switch is maintained on, while the second switch, the third switch, the fourth switch, and the fifth switch are maintained off;

in the seventh state, the second switch are maintained on, while the first switch, the third switch, the fourth switch, and the fifth switch are maintained off; and in the eighth state, the third switch are maintained on, while the first switch, the second switch, the fourth switch, and the fifth switch are maintained off.

* * * * *